United States Patent
Sakaguchi et al.

(10) Patent No.: US 9,947,925 B2
(45) Date of Patent: Apr. 17, 2018

(54) NEGATIVE ELECTRODE FOR LITHIUM-ION SECONDARY BATTERY

(71) Applicant: SANTOKU CORPORATION, Kobe-shi, Hyogo (JP)

(72) Inventors: Hiroki Sakaguchi, Tottori (JP); Hiroyuki Usui, Tottori (JP); Tadatoshi Murota, Kobe (JP); Masatoshi Kusatsu, Kobe (JP)

(73) Assignee: SANTOKU CORPORATION, Hyogo (JP)

( * ) Notice: Subject to any disclaimer, the term of this patent is extended or adjusted under 35 U.S.C. 154(b) by 396 days.

(21) Appl. No.: 14/400,002

(22) PCT Filed: May 10, 2013

(86) PCT No.: PCT/JP2013/063145
§ 371 (c)(1),
(2) Date: Nov. 10, 2014

(87) PCT Pub. No.: WO2013/168786
PCT Pub. Date: Nov. 14, 2013

(65) Prior Publication Data
US 2015/0111103 A1 Apr. 23, 2015

(30) Foreign Application Priority Data

May 11, 2012 (JP) .................................. 2012-109774

(51) Int. Cl.
*H01M 4/58* (2010.01)
*H01M 4/1395* (2010.01)
(Continued)

(52) U.S. Cl.
CPC .............. *H01M 4/58* (2013.01); *C01B 33/06* (2013.01); *C22C 28/00* (2013.01); *C22C 30/00* (2013.01);
(Continued)

(58) Field of Classification Search
CPC .... H01M 4/58; H01M 4/0404; H01M 4/0416; H01M 4/0421; H01M 4/1395;
(Continued)

(56) References Cited

U.S. PATENT DOCUMENTS 6,235,427 B1 * 5/2001 Idota .................... H01M 4/134
29/623.1
2004/0062990 A1 * 4/2004 Shimamura ........... H01M 4/366
429/218.1

(Continued)

FOREIGN PATENT DOCUMENTS

JP 07240201 A * 9/1995
JP 7-302588 A 11/1995
(Continued)

OTHER PUBLICATIONS

English translation of JP 07240201 A, Kubota, Shuji, Sep. 1995, Japan.*

(Continued)

*Primary Examiner* — Jonathan Jelsma
*Assistant Examiner* — Rashid Alam
(74) *Attorney, Agent, or Firm* — Sughrue Mion, PLLC

(57) ABSTRACT

Provided are an anode active material for lithium ion rechargeable batteries and an anode, which are capable, when used in a lithium ion rechargeable battery, of providing excellent charge/discharge capacity and cycle characteristics, and also high rate performance, as well as a lithium ion rechargeable battery using the same. The anode active material contains particles having a crystal phase represented by RA$_x$, wherein R is at least one element selected from the group consisting of rare earth elements including Sc and Y but excluding La, A is Si and/or Ge, and x satisfies (Continued)

$1.0 \leq x \leq 2.0$, and a crystal phase consisting of A. The material is thus useful as an anode material for lithium ion rechargeable batteries.

10 Claims, 4 Drawing Sheets

(51) Int. Cl.
| | |
|---|---|
| *H01M 4/04* | (2006.01) |
| *H01M 4/38* | (2006.01) |
| *C22C 28/00* | (2006.01) |
| *C22C 30/00* | (2006.01) |
| *C01B 33/06* | (2006.01) |
| *H01M 10/0525* | (2010.01) |
| *H01M 4/02* | (2006.01) |

(52) U.S. Cl.
CPC ....... *H01M 4/0404* (2013.01); *H01M 4/0416* (2013.01); *H01M 4/0421* (2013.01); *H01M 4/1395* (2013.01); *H01M 4/38* (2013.01); *H01M 4/386* (2013.01); *H01M 10/0525* (2013.01); *H01M 2004/027* (2013.01)

(58) Field of Classification Search
CPC ... H01M 1/386; H01M 10/0525; C01B 33/06; C22C 28/00; C22C 30/00
USPC ......................................................... 429/218
See application file for complete search history.

(56) References Cited

U.S. PATENT DOCUMENTS

| | | |
|---|---|---|
| 2007/0111100 A1 | 5/2007 | Bito et al. |
| 2007/0224508 A1 | 9/2007 | Aramata et al. |
| 2010/0190059 A1* | 7/2010 | Graetz ................. H01M 4/134 429/231.95 |
| 2010/0288982 A1* | 11/2010 | Le ........................... B02C 17/10 252/513 |
| 2014/0004415 A1* | 1/2014 | Sawa .................... H01M 4/364 429/211 |

FOREIGN PATENT DOCUMENTS

| | | |
|---|---|---|
| JP | 10-294112 A | 11/1998 |
| JP | 2000-3731 A | 1/2000 |
| JP | 2007-165300 A | 6/2007 |
| JP | 2007-294423 A | 11/2007 |
| JP | 2012-178344 A | 9/2012 |
| JP | 2013-125743 A | 6/2013 |

OTHER PUBLICATIONS http://hyperphysics.phy-astr.gsu.edu/hbase/solids/sili2.html accessed Jun. 13, 2017.*
Souptel et. al, CeSi2-σ single crystals: growth features and properties, Journal of Crystal Growth (2004), vol. 269(2-4), pp. 606-616.*
Sakaguchi, Hiroki et al., "Anode Properties of LaSi2/Si Composite Thick-Film Electrodes for Lithium Secondary Batteries" IOP Conference Series: Materials Science and Engineering, (2009)012030, 9 pages total.
European Patent Office, Communication dated Dec. 1, 2015 issued in corresponding European Application No. 13788468.0.
International Searching Authority International Search Report for PCT/JP2013/063145 dated Jul. 16, 2013.

* cited by examiner

NEGATIVE ELECTRODE FOR LITHIUM-ION SECONDARY BATTERY

CROSS REFERENCE TO RELATED APPLICATIONS

This application is a National Stage of International Application No. PCT/JP2013/063145 filed May 10, 2013, claiming priority based on Japanese Patent Application No. 2012-109774 filed May 11, 2012, the contents of all of which are incorporated herein by reference in their entirety.

FIELD OF ART

The present invention relates to an anode active material for lithium ion rechargeable batteries, an anode for lithium ion rechargeable batteries, a method of production thereof, and a lithium ion rechargeable battery.

BACKGROUND ART

Widely-used, portable small electric and electronic devices employ lithium ion rechargeable batteries, which have larger electromotive force and higher energy density compared to alkali rechargeable batteries, such as nickel-cadmium or nickel-hydrogen rechargeable batteries. With the recent improvement in performance and multifunctionality of these devices, further increase in battery capacity is demanded, and development of rechargeable batteries is being made actively.

Various researches have hitherto been made concerning anode active materials for lithium ion rechargeable batteries. Among such materials, lithium metal has been attracting attention as a material for an anode active material, for its capability of providing ample battery capacity. However, lithium metal has battery problems of precipitation of a large amount of dendritic lithium on the lithium surface upon charging to lower charge/discharge efficiency, which leads to short-circuiting the anode and the cathode, and also handling problems, such as instability and high reactivity of lithium per se. These problems impede practical use of lithium metal.

As a material for an anode active material in place of lithium metal, a carbonaceous material has been put into practical use. A carbonaceous material has a lower ratio of expansion/shrinkage due to charge/discharge compared to lithium metal or lithium alloys, but has a smaller battery capacity (theoretically about 372 mAh/g) compared to lithium metal.

In this regard, expected as large-capacity materials are silicon and tin. These materials have larger battery capacities compared to carbonaceous materials, and have been the subjects of active researches. However, these materials have a higher ratio of expansion/shrinkage due to charge/discharge and, when used as an anode active material, will disengage from the collector, leading to shorter battery life and larger irreversible capacity. In an attempt to solve such problem, silicon or tin is alloyed with other elements, or compounded with carbon, for suppressing expansion/shrinkage and reducing batter life shortening and irreversible capacity.

For example, Patent Publication 1 proposes an anode active material containing Li, Si, and C. This anode active material has good cycle characteristics, but a capacity as low as less than a half the capacity of a carbonaceous material.

Patent Publication 2 proposes an anode active material represented by $M_{100-x}Si_x$ (M=Ni, Fe, Co, Mn). This material is a silicide formed of a particular non-combustible transition metal element and a silicon metal, and thus has improved safety. However, the capacity of this material is as low as 672 mAh/g, which is about one sixth of the theoretical capacity 4200 mAh/g of elemental silicon.

Patent Publication 1: JPH07302588A
Patent Publication 2: JPH10294112A

SUMMARY OF THE INVENTION

It is an object of the present invention to provide an anode active material and an anode for lithium ion rechargeable batteries which are capable, when used in a lithium ion rechargeable battery, of providing excellent charge/discharge capacity and cycle characteristics, and also high rate performance.

It is another object of the present invention to provide a lithium ion rechargeable battery which absorbs/desorbs Li, has a large charge/discharge capacity and excellent cycle characteristics.

It is another object of the present invention to provide a lithium ion rechargeable battery which absorbs/desorbs Li, has a large charge/discharge capacity and excellent cycle characteristics, and also high rate performance, realizing high rate charge/discharge.

For the purpose of solving the above problems, the present inventors have made detailed researches on electrodes for lithium ion rechargeable batteries containing anode active materials formed of combinations of various metal elements, from the viewpoints of electrode composition, electrode capacity, and cycle characteristics, to find out that an alloy containing particular amounts of rare earth elements and Si and/or Ge, and having particular crystal phases, can solve the problems, and complete the present invention.

According to the present invention, there is provided an anode active material for a lithium ion rechargeable battery comprising particles having a crystal phase represented by RAx, wherein R is at least one element selected from the group consisting of rare earth elements including Sc and Y but excluding La, A is Si and/or Ge, and x satisfies $1.0 \leq x \leq 2.0$, and a crystal phase consisting of said A (sometimes referred to as the present anode active material hereinbelow).

According to the present invention, there is also provided an anode for a lithium ion rechargeable battery comprising a collector and an active material layer comprising the present anode active material (sometimes referred to as the present anode hereinbelow).

According to the present invention, there is further provided a method of producing the present anode comprising depositing the present anode active material on a collector surface by gas deposition to form an active material layer.

According to the present invention, there is also provided a lithium ion rechargeable battery comprising the present anode, a cathode, a separator, and an electrolyte (sometimes referred to as the present rechargeable battery hereinbelow).

The anode active material of the present invention, having the particular composition and the crystal phases, is capable, when an anode made from this material is used in a lithium ion rechargeable battery, of giving excellent charge/discharge capacity and cycle characteristics to the rechargeable battery, and also enabling high rate performance, realizing high rate charge/discharge.

PREFERRED EMBODIMENTS OF THE INVENTION

Figure 1:
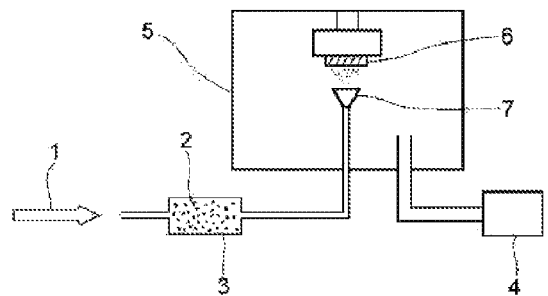
FIG. 1 is a schematic representation of a system for the explanation of gas deposition.

The present invention will now be explained in detail.

The anode active material of the present invention contains RAx phase/A phase-containing composite particles which contain a crystal phase represented by RAx (sometimes referred to as RAx phase hereinbelow) and a crystal phase composed of A (sometimes referred to as A phase hereinbelow).

RAx represents a compound phase of element R and element A, wherein R is at least one element selected from the group consisting of rare earth elements including Sc and Y but excluding La. Element R has a high electron-donating ability and a relatively high density. R preferably includes at least one element selected from the group consisting of Ce, Pr, Nd, Sm, Gd, Dy, and Y, more preferably at least one element selected from the group consisting of Sm, Gd, and Dy.

Element A is Si and/or Ge, and has excellent Li storage capacity.

In RAx, x satisfies $1.0 \leq x \leq 2.0$, with the minimum being preferably 1.4, and the maximum being preferably 1.9, more preferably 1.85, most preferably 1.75. With a larger R content in RAx, electric charge in the obtained anode active material is biased to generate strong polarity between the lattices, which significantly improves anti-decrepitation characteristics and allows expectation for improved cycle characteristics when made into a lithium ion rechargeable battery made using the anode active material. On the other hand, an increased R content proportionally decreases the content of element A, which is susceptible to alloying with lithium, so that the discharge capacity of the resulting lithium ion rechargeable battery may be low. In view of these, in order to fulfill both excellent cycle characteristics and discharge capacity, x is preferably in the above-mentioned range.

In the present anode active material, the RAx phase functions as a matrix for the A phase to further absorb stress caused by volume change in charging/discharging. In addition, the cycle characteristics are improved, while the ratio of element A, which has a large capacity but has large volume change in charging/discharging, in the active material may be increased.

The A phase contributes to the charge/discharge capacity of a lithium ion rechargeable battery and thus, by increasing the content of the A phase in the particles, increase in charge/discharge capacity may be expected. On the other hand, with too much A phase, decrepitation of the particles is encouraged to cause shorter cycle life.

For achieving a suitable range of the ratio between the RAx phase and the A phase in the present anode active material, the mixing ratio of the raw materials, in the case of $RA_2$:A, is preferably 20:80 to 80:20 by mass, more preferably 30:70 to 70:30 in view of the balance between the improvement in charge/discharge capacity and the improvement in cycle characteristics or suppression of expansion/shrinkage of the anode active material, most preferably 20:80 to 40:60 in view of the improved charge/discharge capacity. Here, the composition is expressed assuming that elements R and A contained in the particles compose $RA_2$ and A. Assuming simply that element R is Gd and element A is Si and $GdSi_2$:Si=20:80 by mass, the ratio of the two elements is expressed as Gd:Si=14.73:85.27 by mass. In the Gd—Si phase diagram, the composition is located closer to the Si-side from $GdSi_2$, i.e., contains excess Si. By producing composite particles at this composition, the $GdSi_2$ phase and the Si phase in the particles act effectively to provide excellent cycle characteristics and a high charge/discharge capacity.

The RAx phase and the A phase may be confirmed by powder X-ray diffraction (XRD), and the alloy composition by quantitative analysis by ICP (Inductively Coupled Plasma) atomic emission spectrometry.

The RAx phase in the particles contained in the present anode active material has a crystallite size of usually not larger than 60 nm, preferably 1 to 60 nm. At larger than 60 nm, the effect of relieving volume expansion caused by Li absorption/desorption may be lowered. The crystallite size may be calculated according to the Scherrer formula from the diffraction peak in the (103) plane near $2\theta=29°$ to $31°$ in X-ray diffraction spectrum determined by means of an X-ray diffractometer (UltimaIV, manufactured by RIGAKU CORPORATION) with CuKα radiation.

The anode active material of the present invention may be produced, for example, by strip casting, such as single roll, twin roll, or disk method, melt spinning, metal molding, various atomizing, mechanical alloying (mechanical milling), or arc melting. Among these, arc melting is preferred, but the method is not particularly limited as long as the particles having the desired phases are obtained.

The anode active material of the present invention may optionally be subjected to heat treatment as necessary. Such heat treatment may be carried out usually at 300 to 1200° C. for 0.5 to 30 hours in an inert atmosphere.

The resulting anode active material may optionally be ground as necessary. Such grinding may be carried out in a conventional pulverizer, such as feather mill, hammer mill, ball mill, stamp mill, or attritor, under suitably adjusted conditions of grinding. Alternatively, grinding may be carried out in a mortar, but is not limited to these. After grinding, the material may be sieved as necessary to obtain the particles of a desired particle size.

The anode of the present invention includes a collector and an active material layer containing the present anode active material. The active material layer is usually formed on at least one side of the collector, and has the present anode active material dispersed generally uniformly all over.

The thickness of the active material layer is usually 0.5 to 40 μm, preferably 0.5 to 30 μm, more preferably 0.5 to 25 μm. With the thickness of the active material layer within this range, sufficient anode strength may be achieved while the energy density of the battery is sufficiently improved, and also disengagement of the particles from the active material layer may effectively be prevented.

The collector may be selected from those conventionally used as a collector of a lithium ion rechargeable battery. The collector may preferably be composed of a metal material having low ability to form a lithium compound. As used herein, "having low ability to form a lithium compound" means that the material does not form an intermetallic compound or a solid solution with lithium or, even if it forms, with a trace amount of lithium or in an extremely unstable state. Examples of such metal material may include copper, nickel, and stainless steel. Alternatively, copper alloy foil, typically Corson alloy foil, may also be used. The thickness of the collector is preferably 9 to 35 μm, taking the balance between maintenance of strength of the anode and improvement in energy density into consideration. Incidentally, when used as a collector, copper foil is preferably subjected to chromating or a rust-inhibition treatment using an organic compound, such as triazole or imidazole compounds.

The anode of the present invention may be produced, for example, by dispersing the anode active material, a binder, and an electrically conductive material in a solvent to prepare an anode material mixture, applying the mixture to at least one of the surfaces of the collector, and drying to thereby form an active material layer.

The binder may be, for example, a fluororesin, such as polytetrafluoroethylene or polyvinylidene fluoride, polyvinyl acetate, polymethylmethacrylate, an ethylene-propylene-diene copolymer, a styrene-butadiene copolymer, an acrylonitrile-butadiene copolymer, or carboxymethyl cellulose.

The electrically conductive material may be a carbonaceous material, for example, natural graphite, such as flake graphite, artificial graphite, Ketjen black, or acetylene black.

The method of producing an anode according to the present invention is characterized by, instead of the applying step mentioned above, depositing of the anode active material on a collector by gas deposition. A method of producing an anode by gas deposition will be explained below, but the production method is not particularly limited as long as the desired battery characteristics are achieved.

Gas deposition is a method for depositing raw material powder containing the anode active material on a collector, and advantageous in that the adhesivity between the anode active material particles and the collector as well as between the particles is high. Thus the particles constituting the active material layer are hard to disengage even after repeated charge/discharge, which improves cycle characteristics of a battery. Further, the high adhesivity between the particles may improve electronic conductivity of the anode active material layer even when element A, which has low electronic conductivity, is used. By employing gas deposition, the density of the active material layer becomes non-uniform over the plane as well as in the thickness direction, so that the stress due to volume change caused by Li-absorption/desorption by element A may easily be relieved. This also improves cycle characteristics of a battery. Further, gas deposition advantageously provides high rate film formation.

Gas deposition includes generating aerosol from powder raw material containing the anode active material particles and a carrier gas, and injecting the aerosol over the collector surface to form an active material layer. Here, the powder raw material may optionally contain an electrically conductive metal material as necessary. The method will be explained below with reference to the schematic representation of a system shown in FIG. 1.

Carrier gas 1 at a predetermined initial pressure and powder raw material 2 containing the anode active material are aerosolized in duct 3. The obtained aerosol is injected through nozzle 7 attached at the tip of the duct 3 toward the surface of collector 6 placed in chamber 5, which is kept in vacuo by means of decompressor 4. The powder raw material 2 is deformed due to impingement on the collector 6 and unlikely to maintain its original shape. Gas deposition per se may be carried out according to a conventional method (system). According to the present invention, gas deposition is preferably carried out under the following conditions.

The carrier gas may preferably be, for example, an inert gas, such as argon or nitrogen gas. The differential between the system pressure and the gauge pressure of the gas is preferably about $3 \times 10^5$ to $1 \times 10^6$ Pa. The distance between the collector and the nozzle is preferably about 5 to 30 mm.

In gas deposition, the objective active material layer may be formed by a single injection, but may alternatively be formed by a plurality of injections. Through such multiple injections, a multi-layered active material layer is formed.

The powder raw material containing the anode active material subjected to the injection has an average particle size D50 of usually 1 to 50 μm, preferably 5 to 30 μm. The shape of the anode active material particles is not particularly limited. The average particle size D50 may be determined in a laser diffraction scattering particle size distribution analyzer (trade name MICROTRAC HRA, model 9320-X100, manufactured by NIKKISO CO., LTD.).

The anode obtained by gas deposition discussed above will be explained below with reference to the schematic representation of a sectional structure of the anode shown in FIG. 2.

Figure 2:
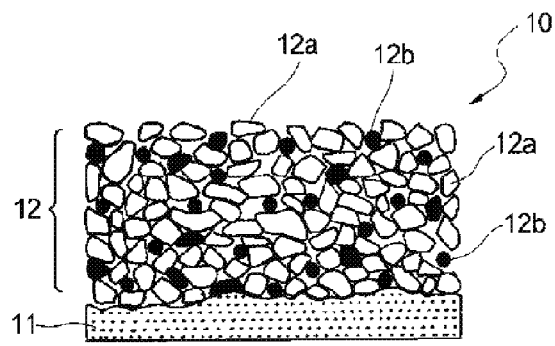
FIG. 2 is a schematic representation of a sectional structure of an anode for the explanation of an embodiment of the present anode.

Referring to FIG. 2, 11 refers to the collector and 12 refers to the active material layer, wherein the active material layer 12 is composed of anode active material 12a and metal material 12b mentioned above, both injected together by gas deposition. Though the particles are shown schematically in the figure, the surface of the anode active material 12a may usually be coated continuously or discontinuously with the metal material 12b, and gaps may be formed between the particles of the anode active material 12a coated with the metal material 12b. Such gaps act as passages for a non-aqueous electrolyte containing lithium ions, and also as space for relieving stress caused by volume change of the anode active material 12a in charging/discharging. The volume of the anode active material 12a increased by charging is absorbed by this space.

Though FIG. 2 shows for the sake of convenience an embodiment wherein the active material layer 12 is formed only on one side of the collector 11, the active material layer 12 may be formed on each side of the collector 11.

The metal material 12b has electrical conductivity, and may be selected from the materials having low ability to forma lithium compound discussed above, such as copper, nickel, iron, cobalt, or alloys thereof. It is particularly preferred to used copper, which has a high ductility, as the metal material 12b. It is also preferred that the metal material 12b is present on the surface of the anode active material 12a all over the thickness of the active material layer 12. The presence of the metal material 12b on the surface of the anode active material 12a all over the thickness of the active material layer 12 may be confirmed by electron microscopic mapping of the metal material 12b.

The average thickness of the metal material 12b coating the surface of the anode active material 12a is usually as thin as 0.05 to 2 µm, preferably 0.1 to 0.25 µm. As used herein, the "average thickness" is a value calculated based on the portions of the surface of the anode active material 12a actually coated with the metal material 12b. That is, the portions of the surface of the anode active material 12a not coated with the metal material 12b are not included in the basis of the calculation of the average value.

The active material layer may alternatively be formed by electroplating in a plating bath. Specifically, for example, slurry containing the anode active material and a binder is applied to a collector, and dried to form a coating film, which is then subjected to electroplating in a particular plating bath to precipitate an electrically conductive material from the plating between the particles of the anode active material, resulting in formation of an active material layer. The amount of space between the anode active material particles and the degree of coating of the particle surface with the electrically conductive material may be regulated by the degree of precipitation of the electrically conductive material by electroplating.

The conditions of the electroplating may suitably be decided depending on the composition and pH of the plating bath, the current density of electrolysis, or the like factors. The pH of the plating bath is usually not lower than 7 and not higher than 11, preferably not lower than 7.1 and not higher than 11. At a pH regulated within this range, dissolution of the A phase is suppressed, the surface of the anode active material particles is cleaned, and plating of the particle surface is encouraged. Simultaneously, appropriate amount of gaps are formed between the particles. The pH value is determined at the temperature in plating.

When, for example, copper is used as the electrically conductive material for plating, use of a copper pyrophosphate bath is preferred. With a copper pyrophosphate bath, the space mentioned above may advantageously be formed easily all over the thickness of the active material layer even when the layer is made thick. Though the electrically conductive material precipitates on the surface of the anode active material particles, it hardly precipitates between the particles, so that the space is easily formed. When a copper pyrophosphate bath is used, the bath composition, the electrolytic conditions, and the pH are preferably as follows.

The bath composition is preferably in the range of 85 to 120 g/l of copper pyrophosphate trihydrate, 300 to 600 g/l potassium pyrophosphate, and 15 to 65 g/l of potassium nitrate, and the bath temperature is preferably 45 to 60° C., the current density is preferably 1 to 7 A/dm$^2$, and the pH is preferably adjusted to 7.1 to 9.5 by adding aqueous ammonia and polyphosphoric acid.

The rechargeable battery according to the present invention has the present anode, a cathode, a separator, and an electrolyte.

The cathode is not particularly limited as long as it is usable as a cathode of a lithium ion rechargeable battery, and may suitably be selected from conventional cathodes.

The separator may preferably be a micro-porous film having a high ion permeability, a predetermined mechanical strength, and an electron insulating property. In view of excellent resistance to the electrolyte and hydrophobicity, use of a micro-porous film made of a material such as polyethylene, polypropylene, polyphenylene sulfide, polyethylene terephthalate, polyamide, or polyimide, is preferred. These materials may be used alone or as a combination of two or more of these. In view of the production cost, inexpensive polypropylene or the like may advantageously be used.

The electrolyte may be a nonaqueous electrolyte composed of an organic solvent and a solute dissolved therein, or a solid electrolyte, and may be any of those conventionally known, without limitation.

The organic solvent used in the nonaqueous electrolyte may be, for example, a aprotic organic solvent, such as N-methylpyrrolidone, tetrahydrofuran, ethylene oxide, methyl ethyl ketone, cyclohexanone, methyl acetate, methyl acrylate, diethyltriamine, dimethylformamide, dimethylacetamide, ethylene carbonate, propylene carbonate, butylene carbonate, dimethyl carbonate, diethyl carbonate, methyl ethyl carbonate, γ-butyrolactone, 1,2-dimethoxyethane, tetrahydrofuran, 2-methyltetrahydrofuran, dimethyl sulfoxide, 1,3-dioxolan, formamide, dimethylformamide, dioxolan, acetonitrile, nitromethane, methyl formate, methyl acetate, phosphate triester, trimethoxymethane, dioxolan derivatives, sulpholane, 3-methyl-2-oxazolidinone, propylene carbonate derivatives, tetrahydrofuran derivatives, diethyl ether, or 1,3-propanesultone. These may be used alone or as a mixed solvent of two or more of these.

The solute dissolved in the organic solvent discussed above may be, for example, $LiClO_4$, $LiPF_6$, $LiBF_4$, $LiAlCl_4$, $LiSbF_6$, LiSCN, $LiCF_3SO_3$, $LiCF_3CO_2$, $Li(CF_3SO_2)_2$, $LiAsF_6$, $LiB_{10}Cl_{10}$, short-chain aliphatic lithium carboxylate, lithium tetrachloroborate, lithium tetraphenylborate, or imides. These may be used alone or as a mixture of two or more of these.

The solid electrolyte may be, for example, a polymer electrolyte, such as of polyethylene oxide type, or a sulfide electrolyte, such as $Li_2S$—$SiS_2$, $Li_2S$—$P_2S_5$, or $Li_2S$—$B_2S_3$. Alternatively, a so-called gel type, wherein a nonaqueous electrolyte solution is carried in a polymer, may be used.

The present rechargeable battery may be in various shapes, including cylindrical, laminated, or coin shape. The present rechargeable battery, in any shape, may be fabricated by placing the above-mentioned components in a battery case, connecting the cathode and the anode to the cathode terminal and the anode terminal, respectively, with collector leads or the like, and sealing the battery case.

EXAMPLES

The present invention will now be explained in more detail with reference to Examples and Comparative Examples, which do not intend to limit the present invention.

Example 1

Preparation of Anode Active Material

Gd and Si were measured out in such a way that the RAx/A raw material composition was $GdSi_2$/Si, RAx:A was 30:70 by mass, and R:A was 22.1:77.9 by mass, and dissolved in an Ar gas atmosphere in an arc melting furnace into an alloy melt. Then the alloy melt was left to cool to obtain a button-shaped alloy of a φ20 mm diameter and 10 mm thickness. The obtained alloy was ground in a stamp mill, and the ground powder was sieved to obtain anode active material particles of 400 mesh or smaller. The obtained anode active material powder was subjected to powder X-ray diffraction to find out that in RAx/A the RAx phase was $GdSi_x$, x was 1.4, and the A phase was Si. The crystallite size of GdSi$_{1.4}$ (RAx) was determined from the diffraction peak in the (103) plane by powder X-ray diffraction (XRD) to be 39 nm. The alloy composition was quantitatively analyzed by ICP atomic emission spectrometry. Further, D50 of the anode active material particles was determined in a laser diffraction scattering particle size distribution analyzer (trade name MICROTRAC HRA, model 9320-X100, manufactured by NIKKISO CO., LTD.). The results are shown in Table 1.

<Production of Anode>

In the system for gas deposition as shown in FIG. 1, an anode was produced under the following conditions, using electrolyte copper foil of 20 μm thick (manufactured by THE NILACO CORPORATION) as a collector, and the anode active material particles obtained above as the anode active material particles. The active material layer of the obtained anode was 2 μm thick.

Carrier gas: argon (4N); pressure differential: 7.0×10$^5$ Pa; nozzle diameter: 0.8 mm; nozzle-collector distance: 10 mm; atmosphere: argon at room temperature.

<Evaluation of Electrode>

Figure 3:
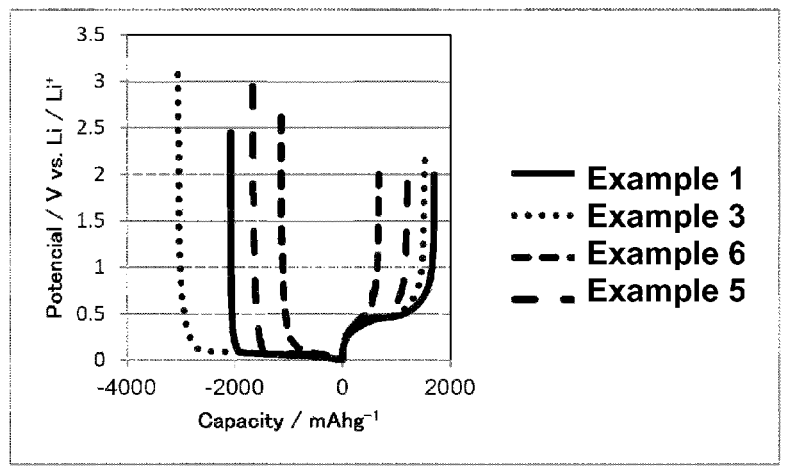
FIG. 3 is a graph showing the charge/discharge curves of the anodes obtained in Examples 1, 3, 5, and 6.
Figure 4:
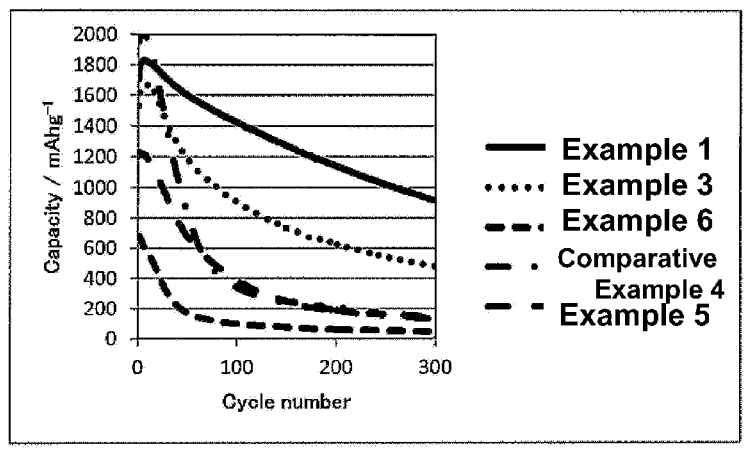
FIG. 4 is a graph showing the cycle characteristics of the anodes obtained in Examples 1, 3, 5, and 6 and Comparative Example 4.
Figure 9:
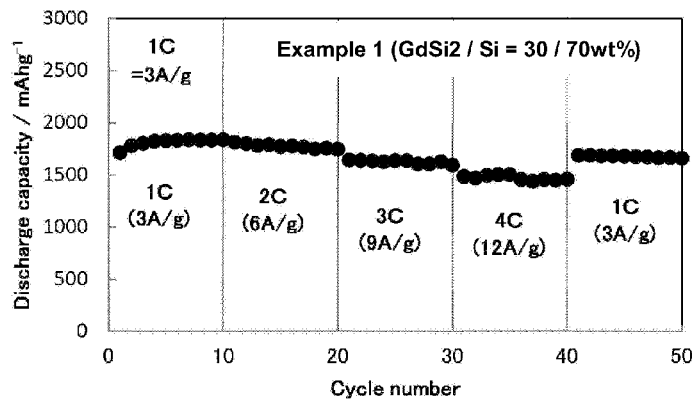
FIG. 9 is a graph showing the rate performance of the anode obtained in Example 1.

A three-electrode cell was fabricated using the anode obtained above, and subjected to charge/discharge to obtain a charge/discharge curve. As the reference electrode and the counter electrode in the three-electrode cell, lithium metal was used. As the electrolyte, a propylene carbonate solution of lithium perchlorate (concentration 1M) was used. The three-electrode cell was tested for cycle characteristics and rate performance. The results are shown in FIGS. 3, 4, and 9 as well as in Table 1. The charge/discharge test was conducted at a current density of 3.0 A/g, a potential range of 0.005 to 2.000 V vs. Li/Li$^+$, and a temperature of 30° C. in an argon gas atmosphere. The rate performance was determined by running 10 cycles each of 1C (3.0 A/g), 2C (6.0 A/g), 3C (9.0 A/g), 4C (12.0 A/g), and 1C (3.0 A/g), in total of 50 cycles.

Examples 2 to 5 and Comparative Examples 1 and 2

Figure 5:
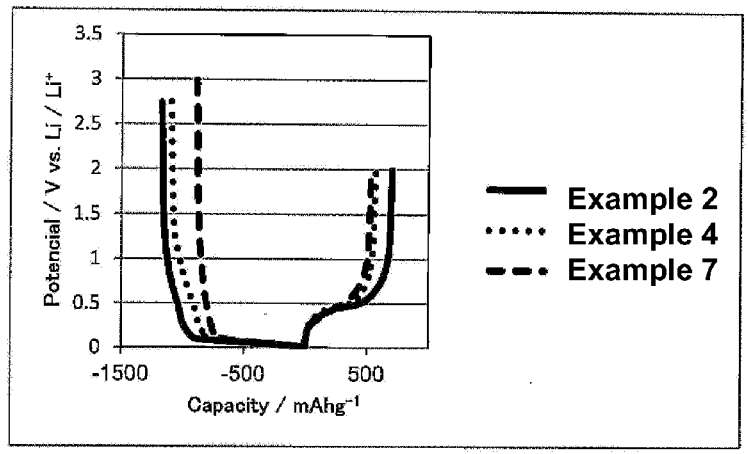
FIG. 5 is a graph showing the charge/discharge curves of the anodes obtained in Examples 2, 4, and 7.
Figure 6:
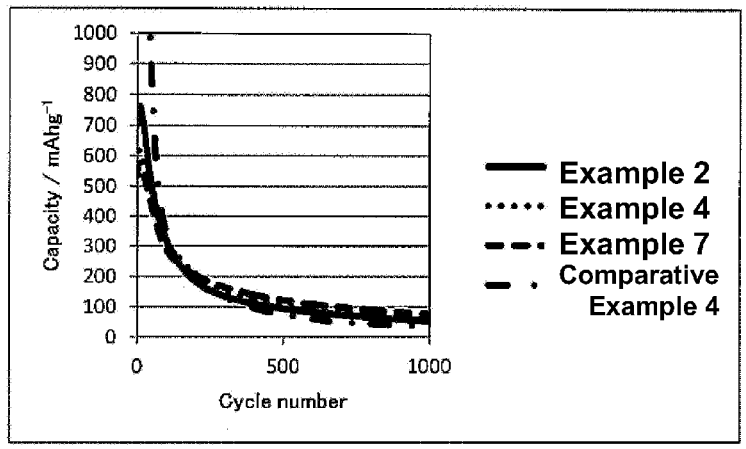
FIG. 6 is a graph showing the cycle characteristics of the anodes obtained in Examples 2, 4, and 7 and Comparative Example 4.
Figure 7:
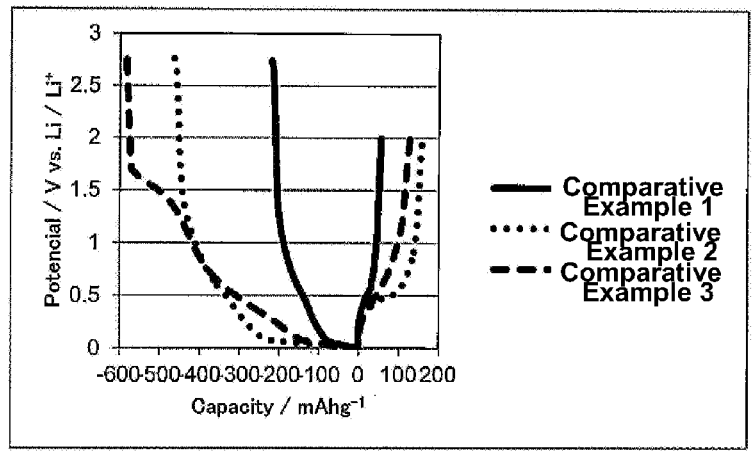
FIG. 7 is a graph showing the charge/discharge curves of the anodes obtained in Comparative Examples 1 to 3.
Figure 8:
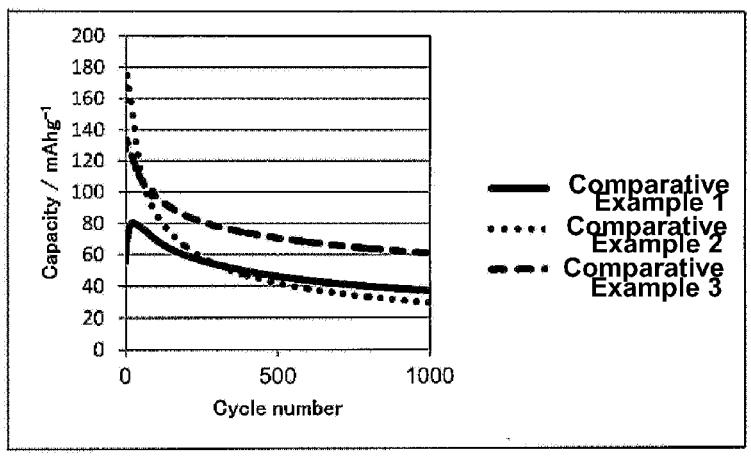
FIG. 8 is a graph showing the cycle characteristics of the anodes obtained in Comparative Examples 1 to 3.

Anode active material particles were prepared in the same way as in Example 1, except that the composition of the raw materials was changed as shown in Table 1. The obtained anode active material particles were subjected to the same measurements and tests as in Example 1. The results are shown in Table 1. Further, an anode was fabricated and evaluated in the same way as in Example 1. The charge/discharge curves and the cycle characteristics in Examples 3 and 5 are shown in FIGS. 3 and 4, respectively, and the latter also in Table 1. The charge/discharge curves and the cycle characteristics in Examples 2 and 4 are shown in FIGS. 5 and 6, respectively, and the latter also in Table 1. Further, the charge/discharge curves and the cycle characteristics in Comparative Examples 1 and 2 are shown in FIGS. 7 and 8, and the latter also in Table 1.

Examples 6 and 7 and Comparative Example 3

Anode active material particles were prepared in the same way as in Example 1, except that the composition of the raw materials was changed as shown in Table 1, and the alloy melt was prepared by mechanical alloying (MA), rather than in an arc melting furnace. The mechanical alloying was carried out in a zirconia vessel containing 15 mm-diameter balls, with the ratio of the sample to the balls of 1:15 by mass, at an orbital speed of 380 rpm for 5 hours.

The obtained anode active material particles were subjected to the same measurements and tests as in Example 1. The results are shown in Table 1. Further, an anode was fabricated and evaluated in the same way as in Example 1. The charge/discharge curve and the cycle characteristics in Example 6 are shown in FIGS. 3 and 4, respectively, and the latter also in Table 1. The charge/discharge curve and the cycle characteristics in Example 7 are shown in FIGS. 5 and 6, respectively, and the latter also in Table 1. The charge/discharge curve and the cycle characteristics in Comparative Example 3 are shown in FIGS. 7 and 8, respectively, and the latter also in Table 1.

Comparative Example 4

Anode active material particles were prepared in the same way as in Example 1, except that elemental Si was simply ground in the same way as in Example 1. The obtained anode active material particles were subjected to the same measurements and tests as in Example 1. The results are shown in Table 1. Further, an anode was fabricated and evaluated in the same way as in Example 1. The cycle characteristics are shown in FIGS. 4 and 6 and Table 1.

Example 8

Figure 10:
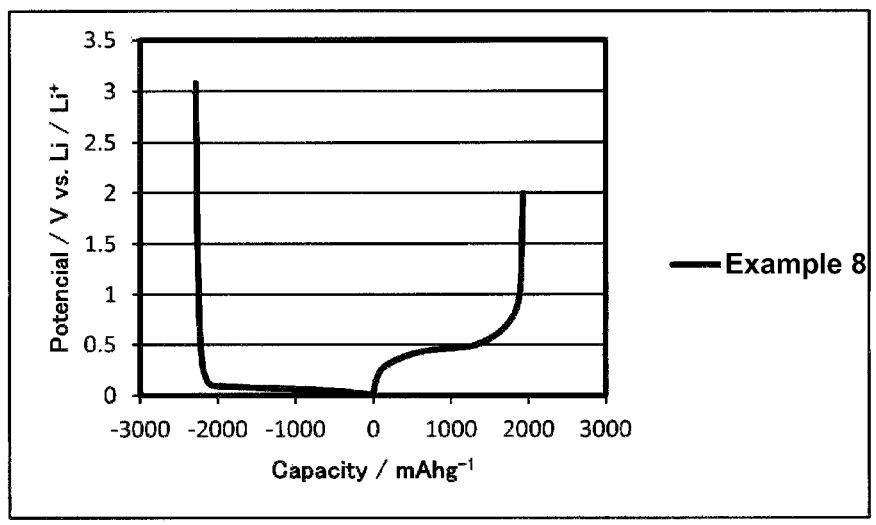
FIG. 10 is a graph showing the charge/discharge curve of the anode obtained in Example 8.
Figure 11:
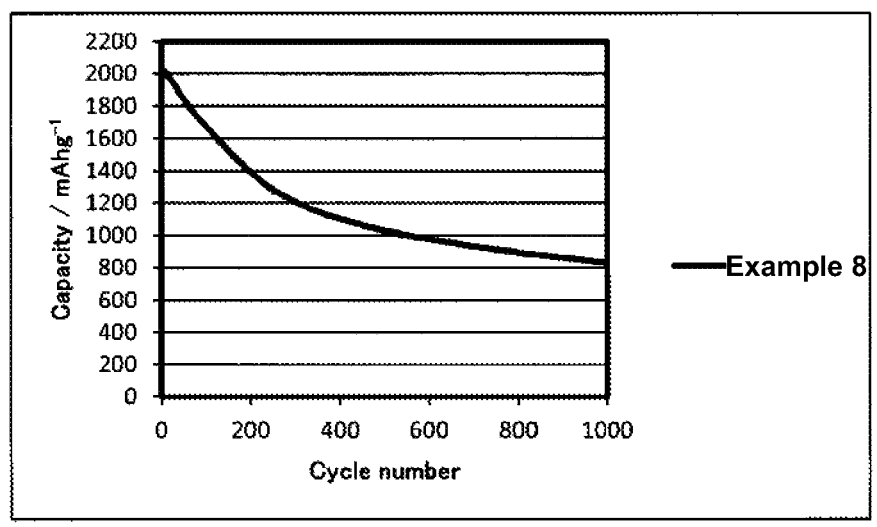
FIG. 11 is a graph showing the cycle characteristics of the anode obtained in Example 8.

Anode active material particles were prepared in the same way as in Example 1, except that x was 1.85. The obtained anode active material particles were subjected to the same measurements and tests as in Example 1. The results are shown in Table 1. Further, an anode was fabricated and evaluated in the same way as in Example 1. The charge/discharge curve and the cycle characteristics are shown in FIGS. 10 and 11, respectively, and the latter also in Table 1.

TABLE 1

| | Raw material | | Starting composition of composite | Composition of raw materials (wt %) | | Discharge capacity (mAh/g) | | | | | Crystallite size of RAx | | |
|---|---|---|---|---|---|---|---|---|---|---|---|---|---|
| | element | | alloy | Expressed as RA$_2$:A | Expressed as R:A | 1 cycle | 50 cycles | 100 cycles | 300 cycles | RAx phase | size of RAx phase | Production method | D50 |
| | R | A | | | | | | | | | | | |
| Example 1 | Gd | Si | GdSi$_2$/Si | 30.0  70.0 | 22.1  77.9 | 1720 | 1602 | 1426 | 919 | GdSi$_{1.4}$ | 39 | Arc melting | 15.2 |
| Example 2 | Gd | Si | GdSi$_2$/Si | 70.0  30.0 | 51.6  48.4 | 720 | 500 | 320 | 135 | GdSi$_{1.4}$ | 44 | Arc melting | 12.7 |
| Example 3 | Dy | Si | DySi$_2$/Si | 30.0  70.0 | 23.0  77.0 | 1536 | 1188 | 903 | 474 | DySi$_{1.75}$ | 48 | Arc melting | 12.6 |
| Example 4 | Dy | Si | DySi$_2$/Si | 70.0  30.0 | 53.7  46.3 | 585 | 440 | 316 | 154 | DySi$_{1.75}$ | 43 | Arc melting | 11.1 |
| Example 5 | Sm | Si | SmSi$_2$/Si | 30.0  70.0 | 21.8  78.2 | 1205 | 681 | 383 | 139 | SmSi$_{1.4}$ | 45 | Arc melting | — |
| Example 6 | Sm | Si | SmSi$_2$/Si | 30.0  70.0 | 21.8  78.2 | 673 | 170 | 99 | 46 | SmSi$_2$ | 6 | MA | — |
| Example 7 | Sm | Si | SmSi$_2$/Si | 70.0  30.0 | 50.9  49.1 | 540 | 431 | 288 | 165 | SmSi$_2$ | 11 | MA | — |
| Example 8 | Gd | Si | GdSi$_2$/Si | 30.0  70.0 | 22.1  77.9 | 1934 | 1845 | 1675 | 1207 | GdSi$_{1.85}$ | 39 | Arc melting | 15.2 |
| Comp. Ex. 1 | Gd | Si | — | 100  0 | 73.7  26.3 | 56 | 77 | 70 | 54 | GdSi$_{1.4}$ | 66 | Arc melting | 15.2 |

TABLE 1-continued

| | Raw material element | | Starting composition of composite alloy | Composition of raw materials (wt %) Expressed as RA$_2$:A | | Expressed as R:A | | Discharge capacity (mAh/g) | | | | RAx phase | Crystallite size of RAx phase | Production method | D50 |
|---|---|---|---|---|---|---|---|---|---|---|---|---|---|---|---|
| | R | A | | | | | | 1 cycle | 50 cycles | 100 cycles | 300 cycles | | | | |
| Comp. Ex. 2 | Dy | Si | — | 100 | 0 | 76.8 | 23.2 | 159 | 113 | 86 | 54 | DySi$_{1.75}$ | 63 | Arc melting | 16.2 |
| Comp. Ex. 3 | Sm | Si | — | 100 | 0 | 72.8 | 27.2 | 129 | 108 | 97 | 78 | SmSi$_2$ | 12 | MA | — |
| Comp. Ex. 4 | — | Si | — | 0 | 100 | 0 | 100 | 1951 | 832 | 343 | 130 | — | — | — | — |

BRIEF DESCRIPTION OF REFERENCE SIGNS

1: carrier gas
2: powder raw material
3: duct
4: decompressor
5: chamber
6: collector
7: nozzle
10: anode
11: collector
12: active material layer
12a: anode active material
12b: metal material

What is claimed is:

1. An anode active material for a lithium ion rechargeable battery comprising particles having a crystal of RAx and a crystal of A,
    wherein R is at least one element selected from the group consisting of Pr, Nd, Sm, Gd, and Dy,
    A is Si and/or Ge, and
    x satisfies 1.4≤x≤1.85, and
    wherein a crystallite size of the crystal of RAx is not larger than 60 nm.

2. A method of producing an anode suitable for use in a lithium ion rechargeable battery, comprising depositing the anode active material of claim 1 on a collector surface by gas deposition to form an active material layer, wherein the battery comprises a collector and the active material layer.

3. The anode active material according to claim 1, wherein R comprises at least one element selected from the group consisting of Sm, Gd, and Dy.

4. An anode for a lithium ion rechargeable battery comprising a collector and an active material layer comprising the anode active material of claim 3.

5. A lithium ion rechargeable battery comprising the anode of claim 4, a cathode, a separator, and an electrolyte.

6. The anode active material according to claim 1, wherein x satisfies 1.4≤x≤1.75.

7. An anode for a lithium ion rechargeable battery comprising a collector and an active material layer comprising the anode active material of claim 6.

8. A lithium ion rechargeable battery comprising the anode of claim 7, a cathode, a separator, and an electrolyte.

9. An anode for a lithium ion rechargeable battery comprising a collector and an active material layer comprising the anode active material of claim 1.

10. A lithium ion rechargeable battery comprising the anode of claim 9, a cathode, a separator, and an electrolyte.

* * * * *